Sept. 1, 1931.  W. H. JUERGENS  1,821,838
LOAD BRAKE FOR HOISTS
Filed Nov. 12, 1930
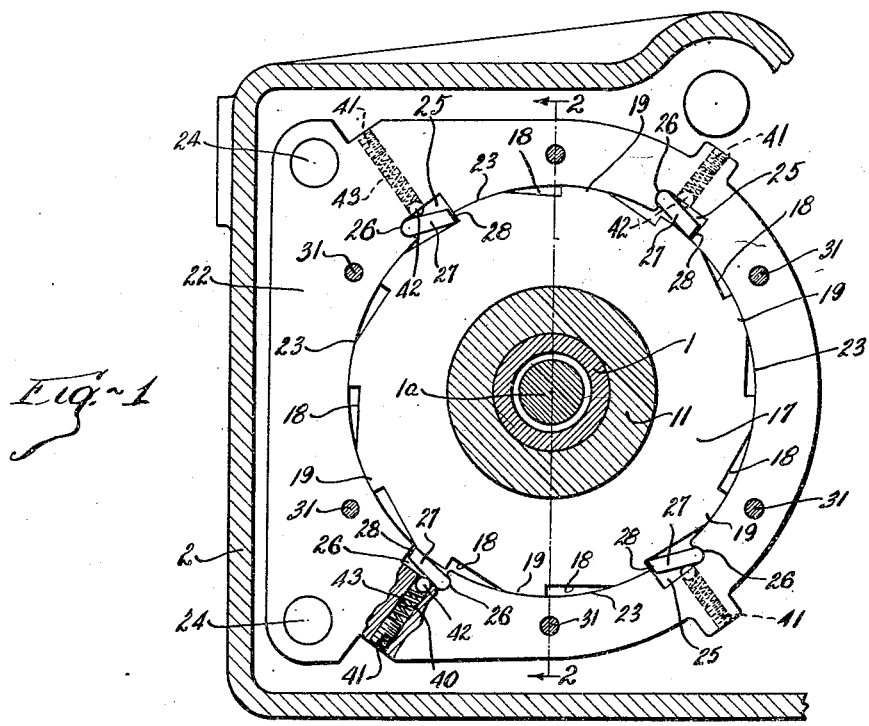
Fig. 1
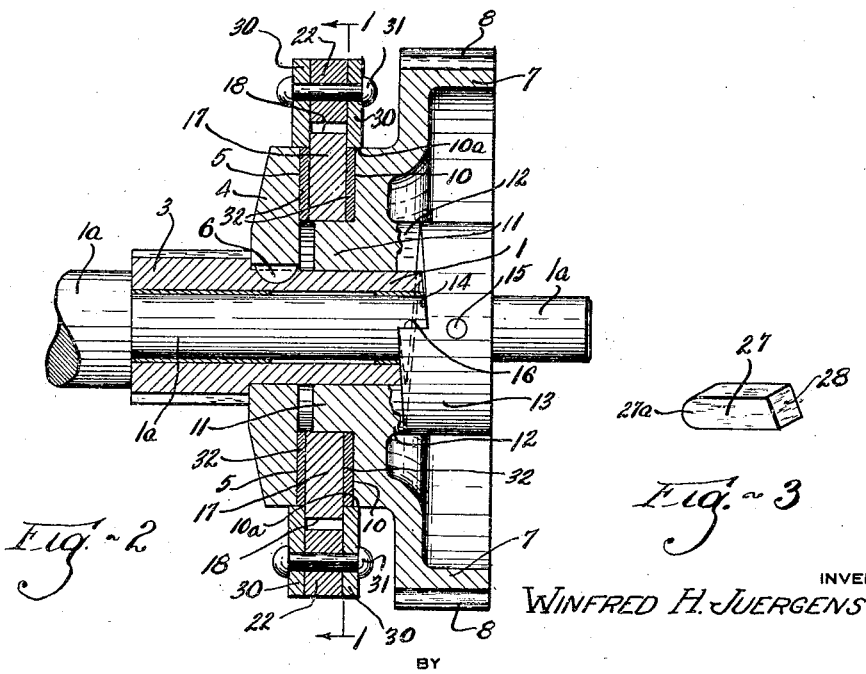
Fig. 2
Fig. 3
INVENTOR
WINFRED H. JUERGENS
BY
Brockett, Hyde, Higley & Meyer
ATTORNEYS Patented Sept. 1, 1931

1,821,838

UNITED STATES PATENT OFFICE

WINFRED H. JUERGENS, OF CLEVELAND, OHIO, ASSIGNOR TO THE EUCLID CRANE & HOIST COMPANY, OF EUCLID, OHIO, A CORPORATION OF OHIO

LOAD BRAKE FOR HOISTS

Application filed November 12, 1930. Serial No. 495,118.

This invention relates to load brakes for hoists. Such a load brake includes both friction load-supporting means, and such a brake is illustrated and described in my copending application, Serial No. 476,076, filed August 18, 1930; and this invention comprises generally improvements in the brake there shown.

More specifically the invention embraces an improved type of ratchet pawl, particularly adapted to such apparatus and capable of faster acting than the pawl type shown in the copending application.

This invention also includes certain improvements in the manner of mounting the friction disks and cooperative parts.

The exact nature of this invention together with further objects and advantages thereof will be apparent from the following description taken in connection with the accompanying drawings, in which Fig. 1 is a sectional elevation transverse to the main shaft of the apparatus, parts being broken away to show details of construction; Fig. 2 is a typical sectional elevation in a longitudinal plane, the plane of Fig. 1 being indicated by the line 1—1, Fig. 2 and the plane of Fig. 2 being indicated by the line 2—2, Fig. 1; and Fig. 3 is a perspective view of one of the pawls appearing in Fig. 1.

With reference now to the drawings, the brake shaft 1, here shown as in the form of a sleeve carried upon the spindle 1a, is thus mounted for rotation in a housing 2 for the parts which appear. Secured upon the shaft 1, and shown as integral therewith, is a pinion 3 which meshes with the first of a train of gears for driving a hoisting drum, these parts not appearing as forming no part of this invention. Adjacent the pinion 3 and also fixed against any movement upon the shaft 1 is a discoid member 4 presenting a plane face 5. In construction the pinion 3 may be integral with the shaft as shown and the member 4 secured by a key 6. Next upon the shaft 1 is a gear 7. This gear is free to rotate upon the shaft and may be driven by a pinion not shown but meshing with the teeth 8 of the gear. The gear has a face 10 opposite the face 5 of the member 4, and a hub portion 11 projecting beyond the face 10. The faces 5 and 10 are of equal diameters, that is, the diameter of the member 4 is that of the shoulder 10a formed at the periphery of the face 10. Opposite the hub portion 11, the gear 7 has another hub portion 12 having its end face finished to provide a helical cam. A cam member 13 having end face 14 cut to cooperate with the cam face of the hub 12, is secured upon the shaft 1 as conventionally indicated by the pin 15. The cam faces of the parts include shoulders as at 16 and the parts are so arranged that when the gear 7 is driven right-hand Fig. 1, which is the hoist direction, the friction between the gear and the member 13 will cause the gear to advance along the shaft 1 toward the left Fig. 2; whereas when the gear is operated in reverse or lowering direction the shoulder 16 will engage the corresponding part of the gear hub 12 to drive the shaft 1 positively left-hand Fig. 1. Mounted upon the hub 11 of the gear 7 to freely rotate thereon is a ratchet wheel or plane 17. The wheel is, therefore, between the faces 5 and 10, and it extends slightly beyond the peripheral edges of these faces. The wheel has peripherally spaced notches 18 providing ratchet teeth 19 correspondingly spaced.

In the plane of the ratchet wheel and preferably of substantially equal thickness therewith is an anchor plate 22 having a circular through opening 23 by which the anchor plate may bear upon the teeth 19 of the ratchet plate, so that the latter may freely rotate therewithin. Rotation of the anchor plate, however, is positively prevented by a pair of pins 24 secured in the casing 2 and loosely fitting in openings in the anchor plate for the purpose.

The anchor plate is provided with a number of recesses 25 opening onto the periphery of the ratchet wheel. Each recess 25 terminates at one end in a socket 26 of cylindrical form running in the direction of the shaft 1 and thus transversely through the anchor plate. For each recess 25 there is a detent 27 having at one end a cylindrical conformation 27a corresponding with the notch 26 and at the opposite end a face 28. The thickness of each detent is such that it may be received within its recess 25 to allow rotation of the ratchet plate 17; the width is that of the ratchet plate; and the length such that the detent may bear in its socket 26 and have pivotal motion to bring its face 28 against the square shoulder formed by one of the ratchet teeth.

In the anchor plate 22 leading outwardly from each of the recesses 25 is a bore 40 threaded at its outer extremity to receive a screw plug 41. Each bore leads into its recess adjacent the socket portion 26 thereof as indicated Fig. 1. In the end of each bore adjacent the corresponding detent is a ball 42, and between this ball and its corresponding plug 41 is a compression spring 43. The proportion of the parts is such that each ball 42 may move freely in its bore 40 to advance under the action of its spring or to recede under the action of its detent; but will be retained in the bore by the detent even though the latter be in extended position in one of the ratchet plate notches. Tension of the springs 43 is controlled by the setting of the plugs 41. By the described arrangement very free and fast pawl action of the detents is had, together with comparative silence. The retaining action is very positive as a detent acting to secure the ratchet plate against reverse rotation, is stressed directly in compression between its socket 26 and the ratchet tooth. The detents 27 are retained against endwise motion in the assembly by a pair of ringshaped side plates 30 secured with the anchor plate 22 on its opposite faces as by rivets 31. The side plates extend inwardly beyond the bases of the notches 18 of the ratchet wheel, one to bear peripherally upon the member 4, the other to similarly bear upon the shoulder 10a of the gear 7.

On each side of the ratchet wheel, and between the faces 5 and 10 is a ring-shaped disk 32 of friction material. The outer diameter of these disks is such that they are centered each by its side plate 30, and each disk has a central opening to clear the gear hub 11.

Operation will be as follows: Supposing no force applied to the gear 7 by its driving pinion, but force applied to the shaft 1 through its pinion 3 to rotate the shaft left-hand Fig. 1, the cam 13 tends to move with the shaft, which forces the gear 7 left-hand Fig. 2, clamping the ratchet wheel between the brake faces 5 and 10, these parts having the described friction disks 32 therebetween. The ratchet wheel is prevented from left-hand rotation, however by one of the detents 27 backed by the anchor plate 22. No motion of the shaft 1, therefore, takes place.

Suppose the gear 7 to be driven in right-hand direction. Such rotation of the gear, because of the cam 13, maintains the ratchet wheel 17 frictionally secured with the shaft 1 so that the ratchet wheel rotates therewith as it is allowed to do by the detents 27.

Suppose now, the parts having been stationary, the gear 7 be driven in the opposite direction. Immediately the gear moves it frees itself from the cam surface of the member 13 and engages this member by the shoulder 16 positively driving the shaft 1 left-hand Fig. 1. This relative motion of the gear and cam frees the ratchet wheel from the faces 5 and 10 allowing the ratchet wheel to remain stationary as it is required to do by the controlling detent 27.

As the friction facings 32 become worn, allowing the gear 7 to more closely approach the member 4, the action of the parts will be nevertheless as described; and until the friction facings are entirely worn out.

It will be noted that the brake parts provides a maximum of braking surface between the confines of the faces 5 and 10 and the circumferential 11 and 10a. The members 30 may bear upon the members 4 and 10a. The brake disks 32 are coextensive with the braking surfaces against which they bear.

What I claim is:

1. Apparatus of the character described and comprising a rotatable driving member having a hub portion and a shoulder concentric therewith, a circular ratchet plate rotatable upon said hub portion, an anchor plate arranged in the plane of said ratchet plate to bear upon the periphery thereof, a side plate secured with said anchor plate with an inner edge portion bearing upon said shoulder, and a friction disk arranged on the face of said ratchet plate and positioned thereon by said side plate, with a central opening to clear said driving member hub portion.

2. Apparatus of the character described and comprising a brake shaft, discoid and driving members thereon, said driving member having a shoulder and having a hub portion extending beyond said shoulder toward said discoid member, a circular ratchet plate rotatable upon said hub portion, an anchor plate arranged in the plane of said ratchet plate to bear upon the periphery thereof, a side plate secured with said anchor plate with an inner edge portion bearing upon said shoulder, a second side plate secured with said anchor plate with an inner edge portion overlying said discoid member, and friction disks arranged on the faces of said ratchet plate and positioned thereon by said side plates and having central openings to clear said driving member hub portion.

In testimony whereof I hereby affix my signature.

WINFRED H. JUERGENS.